US009025481B2

(12) United States Patent
Gao et al.

(10) Patent No.: US 9,025,481 B2
(45) Date of Patent: May 5, 2015

(54) APERIODIC CQI/PMI REQUEST IN CARRIER AGGREGATION

(75) Inventors: Chunyan Gao, Beijing (CN); Peng Chen, Beijing (CN); Timo Lunttila, Espoo (FI)

(73) Assignee: Nokia Corporation, Espoo (FI)

( * ) Notice: Subject to any disclaimer, the term of this patent is extended or adjusted under 35 U.S.C. 154(b) by 193 days.

(21) Appl. No.: 13/643,963

(22) PCT Filed: Apr. 30, 2010

(86) PCT No.: PCT/CN2010/072392
§ 371 (c)(1),
(2), (4) Date: Oct. 26, 2012

(87) PCT Pub. No.: WO2011/134174
PCT Pub. Date: Nov. 3, 2011

(65) Prior Publication Data
US 2013/0039327 A1 Feb. 14, 2013

(51) Int. Cl.
*H04W 72/04* (2009.01)
*H04L 1/00* (2006.01)
(Continued)

(52) U.S. Cl.
CPC ............ *H04L 1/0026* (2013.01); *H04L 5/0053* (2013.01); *H04W 72/1226* (2013.01); *H04L 1/0027* (2013.01); *H04L 1/0028* (2013.01); *H04L 1/06* (2013.01); *H04L 5/0007* (2013.01); *H04L 5/001* (2013.01); *H04L 5/0096* (2013.01); *H04L 5/0098* (2013.01)

(58) Field of Classification Search
CPC .......................... H04L 5/0053; H04W 72/1226

USPC .................................................. 370/252, 330
See application file for complete search history.

(56) References Cited

U.S. PATENT DOCUMENTS

2010/0098012 A1  4/2010  Bala et al.
2011/0143749 A1*  6/2011  Guo et al. ..................... 455/424
(Continued)

FOREIGN PATENT DOCUMENTS

CN       101674586 A      3/2010
CN       101826949 A      9/2010
WO    WO-2010076042 A1   7/2010

OTHER PUBLICATIONS

"Aperiodic CQI Reporting for Carrier Aggregation", 3GPP TSG-RAN WG1 Meeting 60, R1-101262, Agenda: 7.1.7, Panasonic et al., Feb. 22-26, pp. 1-2.

(Continued)

*Primary Examiner* — Jay P Patel
(74) *Attorney, Agent, or Firm* — Harrington & Smith

(57) ABSTRACT

A user's downlink component carriers DL-CCs are divided into groups. An aperiodic CQI/PMI report is triggered by signaling (for example one bit). There is a pattern that maps the signaled trigger to a particular DL-CC within a group of DL-CCs that are configured for a user equipment UE, and that mapped particular DL-CC is determined to be the subject of the aperiodic report. In various embodiments the pattern is implicit and points to the DL-CC for which an aperiodic report has not been sent for more than a threshold time interval; or to the DL-CC for which resources have not been allocated for a periodic report; or to every DL-CC in the group that are activated for the user equipment. Examples are detailed for apparatus, method and computer program from the perspective of the network and from the perspective of the UE.

20 Claims, 7 Drawing Sheets

(51) Int. Cl.
*H04L 5/00* (2006.01)
*H04W 72/12* (2009.01)
*H04L 1/06* (2006.01)

(56) References Cited

U.S. PATENT DOCUMENTS

| | | | | |
|---|---|---|---|---|
| 2011/0199944 | A1* | 8/2011 | Chen et al. | 370/280 |
| 2011/0243012 | A1* | 10/2011 | Luo et al. | 370/252 |
| 2012/0039199 | A1* | 2/2012 | Chen et al. | 370/252 |
| 2012/0057499 | A1 | 3/2012 | Pedersen et al. | 370/252 |
| 2012/0182944 | A1* | 7/2012 | Sorrentino et al. | 370/329 |
| 2012/0307757 | A1* | 12/2012 | Von Elbwart et al. | 370/329 |
| 2013/0010720 | A1* | 1/2013 | Lohr et al. | 370/329 |
| 2013/0016676 | A1* | 1/2013 | Lohr et al. | 370/329 |
| 2013/0039202 | A1* | 2/2013 | Feuersanger et al. | 370/252 |
| 2013/0089043 | A1 | 4/2013 | Lunttila et al. | 370/329 |
| 2013/0142163 | A1* | 6/2013 | Liu et al. | 370/329 |

OTHER PUBLICATIONS

"3rd Generation Partnership Project; Technical Specification Group Radio Access Network; Evolved Universal Terrestrial Radio Access (E-UTRA) and Evolved Universal Terrestrial Radio Access Network (E-UTRAN); Overall Description; Stage 2 (Release 8)", 3GPP TS 36.300, V8.6.0, Sep. 2008, pp. 1-137.

"3rd Generation Partnership Project; Technical Specification Group Radio Access Network; Requirements for Further Advancements for Evolved Universal Terrestrial Radio Access (E-UTRA) (LTE-Advanced) (Release 9)", 3GPP TR 36.913, V9.0.0, Dec. 2009, pp. 1-15.

"CQI/PMI/RI Reporting for Carrier Aggregation", 3GPP TSG RAN WG1 Meeting #60bis, R1-101940, Agenda: 6.2.3.3, Huawei, Apr. 12-16, 2010, 5 pages.

International Search Report and Written Opinion received for corresponding Patent Cooperation Treaty Application No. PCT/CN2010/072392, dated Feb. 10, 2011, 12 pages.

PCT Application No. PCT/EP2010/053919, "Signalling of Channel Information", filed on Mar. 25, 2010, 40 pages.

PCT Application No. PCT/EP2009/050039, "Providing of Channel Quality Information in Communications System", filed on Jan. 5, 2009, 24 pages.

"Downlink PDCCH Signaling and CQI Measurement for LTE-A Bandwidth Extension", IPCOM000178173D / Not filed, only published on Feb. 13, 2009. (5 pages).

* cited by examiner

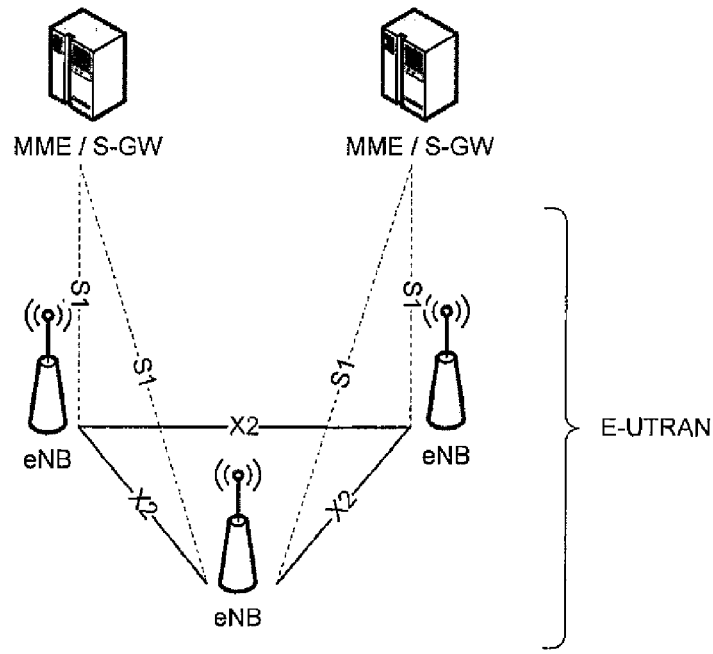
Figure 1: Prior Art
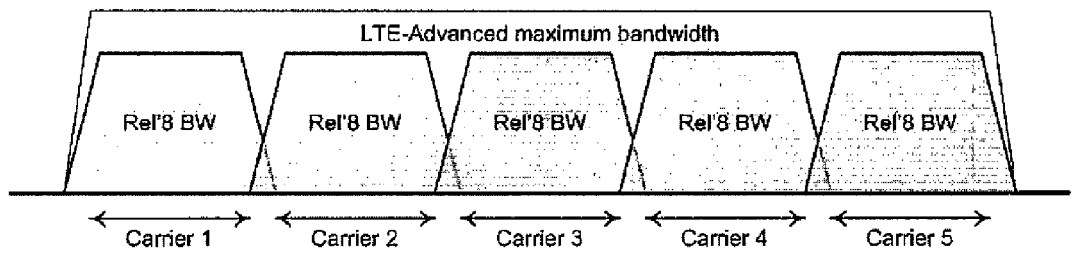
Figure 2: Prior Art

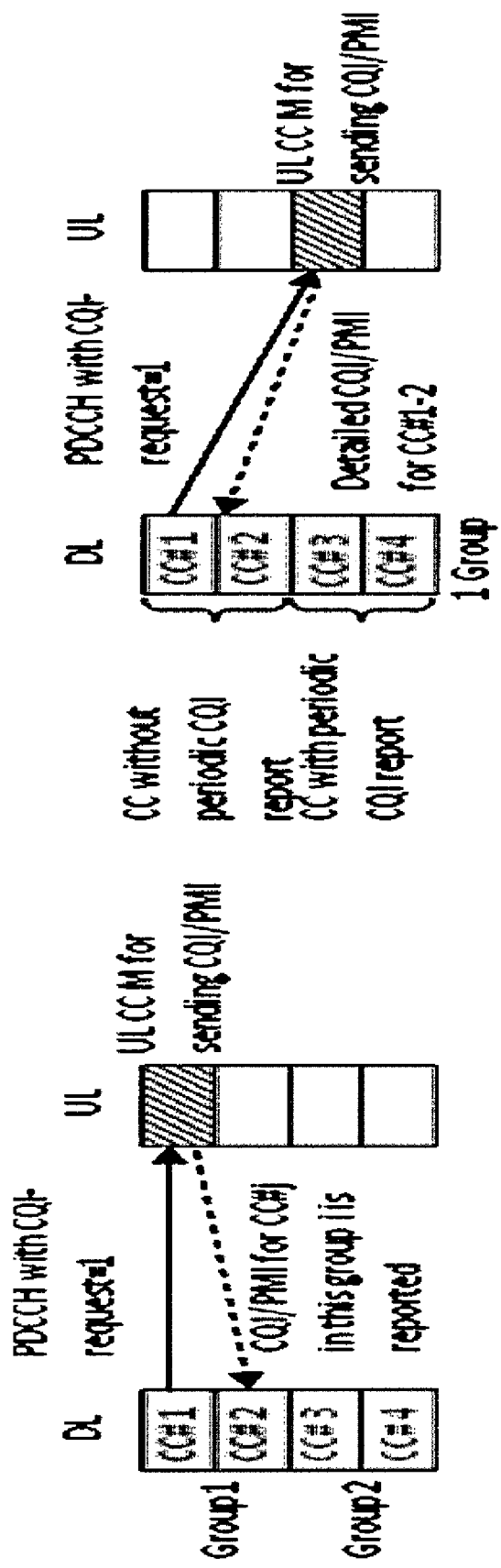

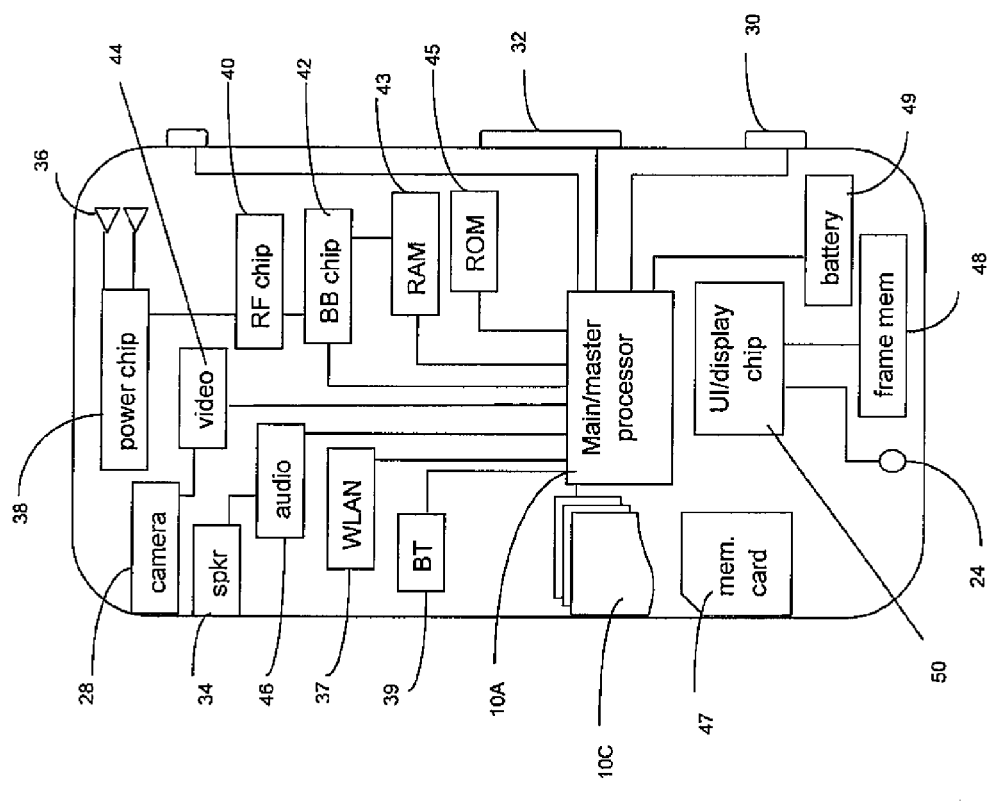
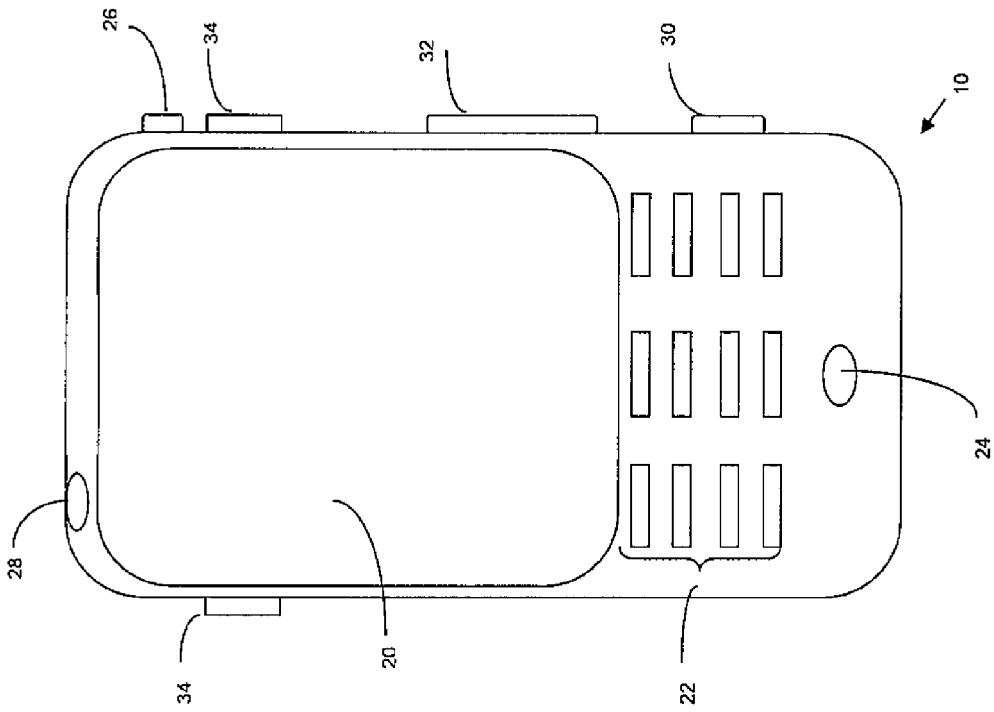
Figure 7

APERIODIC CQI/PMI REQUEST IN CARRIER AGGREGATION

RELATED APPLICATION

This application was originally filed as PCT Application No. PCT/CN2010/072392 filed Apr. 30, 2010.

TECHNICAL FIELD

The exemplary and non-limiting embodiments of this invention relate generally to wireless communication systems, methods, devices and computer programs and, more specifically, relate to control signaling in a communication system which employs carrier aggregation.

BACKGROUND

This section is intended to provide a background or context to the invention that is recited in the claims. The description herein may include concepts that could be pursued, but are not necessarily ones that have been previously conceived or pursued. Therefore, unless otherwise indicated herein, what is described in this section is not prior art to the description and claims in this application and is not admitted to be prior art by inclusion in this section.

The following abbreviations that may be found in the specification and/or the drawing figures are defined as follows:

3GPP third generation partnership project
CA carrier aggregation
CC component carrier
CIF carrier indication field
CQI channel quality indicator
CSI channel state information (includes CQI, PMI and RI)
DL downlink (eNB to UE)
eNB EUTRAN Node B (evolved Node B/base station)
E-UTRAN evolved UTRAN (LTE)
LTE long term evolution
MAC medium access control
PDCCH physical downlink control channel
PDSCH physical downlink shared channel
PMI precoding matrix indicator
PUCCH physical uplink control channel
PUSCH physical uplink shared channel
RI rank indicator, UEs recommendation for the number of layers to be used in spatial multiplexing
RRC radio resource control
UE user equipment
UL uplink (UE to eNB)
UTRAN universal terrestrial radio access network In the communication system known as evolved UTRAN (E-UTRAN, also referred to as UTRAN-LTE or E-UTRA), the LTE Release 8 is completed, the LTE Release 9 is being standardized, and the LTE Release 10 is currently under development within the 3GPP. In LTE the downlink access technique is orthogonal frequency multiple division access OFDMA, and the uplink access technique is single carrier, frequency division multiple access SC-FDMA. These access techniques are expected to continue in LTE Release 10.

FIG. 1 reproduces FIG. 4.1 of 3GPP TS 36.300, V8.6.0 (2008-09), and shows the overall architecture of the E-UTRAN system. The EUTRAN system includes eNBs, providing the EUTRA user plane and control plane (RRC) protocol terminations towards the UE. The eNBs are interconnected with each other by means of an X2 interface. The eNBs are also connected by means of an S1 interface to an evolved packet core, more specifically to a MME and to a Serving Gateway. The S1 interface supports a many to many relationship between MMEs/Serving Gateways and the eNBs.

Of particular interest herein are the further releases of 3GPP LTE targeted towards future international mobile telecommunications (IMT)-advanced systems, referred to herein for convenience simply as LTE-Advanced (LTE-A). LTE-A is directed toward extending and optimizing the 3GPP LTE Release 8 radio access technologies to provide higher data rates at very low cost. LTE-A will most likely be part of LTE Release 10 which is to be backward compatible with LTE Release 8 and to include bandwidth extensions beyond 20 MHz, among others. For an overview see for example 3GPP TR 36.913 v9.0.0 (2009-12) Requirements for further advancements for Evolved Universal Terrestrial Radio Access (E-UTRA) (LTE_Advanced) (Release 9).

The bandwidth extension in LTE Release 10 is to be done via carrier aggregation (CA), in which several component carriers, at least one of which is Release 8 compatible, are aggregated together to form a system bandwidth. This is shown by example at FIG. 2 in which there are five Release 8 compatible CCs aggregated to form one larger LTE Release 10 bandwidth. Existing Release 8 terminals can receive and/or transmit on at least one of the CCs for backward compatibility, while future LTE-A terminals could potentially receive/transmit on multiple CCs at the same time to give the eNB greater scheduling flexibility while increasing data throughput.

In LTE Release 8/9, there is no CA and so there is no ambiguity as to which PDSCH/PUSCH is referred to by a particular PDCCH. LTE-Advanced, so-called "cross-CC scheduling" has been supported via carrier indicator field (CIF), which means the PDCCH could be used to indicate PDSCH/PUSCH resources sent on other CCs indicated by CIF. From the PDCCH transmission perspective this is useful for uneven traffic loads among multiple carriers, and/or in a heterogeneous environment where cross-scheduling is used to schedule using the CC which has less interference.

Specifically, in LTE Release 8/9, the periodic CQI/PMI/RI report is configured by higher layers and transmitted on the PUCCH. The aperiodic CQI/PMI report is triggered by a 1-bit CQI-request in DCI format 0 or by a Random Access Response Grant transmitted on the PUSCH. It may be advantageous to configure periodic CQI/PMI reporting independently for each CC in the CA arrangement of LTE Release 10, such as with similar parameters as used in LTE Release 8/9 (for example; periodicity, subframe offset, resource allocation, reporting mode). This is much less practical for aperiodic reports since by their nature they are not repeating, and so extending the LTE Release 8/9 rules to each CC in a CA system would impose a high control signaling overhead.

In LTE-Advanced, multiple DL CCs may be configured/activated for one UE. Among these DL CCs, there may be dynamically requested aperiodic CQI/PMI reports on one or multiple DL CCs. In such case, 1-bit CQI-request is obviously insufficient to trigger aperiodic CQI/PMI/RI report for one or multiple selected CCs. In such a case, for aperiodic CQI/PMI/RI report the UE needs to know which DL CC(s) eNB needs aperiodic CQI/PMI/RI report, and also which UL CC is used to convey aperiodic CQI/PMI/RI report. The one-bit signaling mechanism in LTE Release 8/9 is insufficient to signal this more expansive but necessary information.

There have been some attempts to design a system for LTE Release 10 to trigger aperiodic CQI/PMI reporting for a specific DL CC. One approach is to extend the bit-length of the CQI-request field. The inventors see this as less than optimal because in order to avoid increased the UE's blind decoding efforts, additional padding bits will be introduced (for example, to the DCI format 1A), which means additional payload waste. This approach is described generally at International Patent Application no. PCT/EP2010/053919 (filed Mar. 25, 2010).

Another approach is to re-use some bits in DCI format 0 to carry the additional information needed in the case of multiple DL CCs. These "enhanced CQI-request bits" may be for example padding bits, or CIF, or RA bits. But in fact these bits are not always unused and so to make them always available for such enhanced CQI request bits would appear to impose scheduling restraints on the eNB, and 3GPP LTE aims to maximize network scheduling flexibility as a means to most efficiently deploy radio resources. This approach is also described at the above-cited PCT/EP2010/053919.

A third approach, outlined in document R1-101262 entitled "Aperiodic CQI Reporting for Carrier Aggregation (3GPP TSG-RAN WG1 Meeting 60 (22-26 Feb. 2010, San Francisco, Calif. USA), is to use the one-bit CQI request of LTE Release 8/9 to trigger in LTE Release 10 an aperiodic report for all DL CCs. This is inefficient from an UL signaling overhead point of view since the eNB will not always needs aperiodic CQI/PMI/RI reports for ALL configured/activated DL CCs.

International Patent Application no. PCT/EP2009/050039 (filed Jan. 5, 2009) proposes identifying the best CC and only reporting a frequency selective CQI for that particular CC, plus potentially reporting wideband for other CCs. A publication entitled "Downlink PDCCH Signaling and CQI Measurement for LTE-A Bandwidth Extension" (disclosure number IPCOM000178173DE dated Feb. 13, 2009, seen at http://ip.com/IPCOM/000178173) proposes letting the CC being CQI-reported hop depending on a modulo operation of the system frame number (SFN) and the UE ID.

SUMMARY

In accordance with a first aspect the exemplary embodiments of the invention include a method comprising: signaling to a user equipment a trigger for an aperiodic report; and using a pattern to map the signaled trigger to a particular downlink component carrier within a group of downlink component carriers that are configured for the user equipment to determine that the particular downlink component carrier is the subject the aperiodic report that is received in response to the trigger.

In accordance with a second aspect the exemplary embodiments of the invention include a memory storing a program of computer readable instructions that when executed by a processor result in actions comprising: signaling to a user equipment a trigger for an aperiodic report; and using a pattern to map the signaled trigger to a particular downlink component carrier within a group of downlink component carriers that are configured for the user equipment to determine that the particular downlink component carrier is the subject the aperiodic report that is received in response to the trigger.

In accordance with a third aspect the exemplary embodiments of the invention include an apparatus comprising at least one processor and at least one memory including computer program code. In this third aspect the at least one memory and the computer program code are configured, with the at least one processor, to cause the apparatus to at least: signal to a user equipment a trigger for an aperiodic report; and use a pattern to map the signaled trigger to a particular downlink component carrier within a group of downlink component carriers that are configured for the apparatus to determine that the particular downlink component carrier is the subject the aperiodic report that the apparatus receives in response to the trigger.

In accordance with a fourth aspect the exemplary embodiments of the invention include a method comprising: receiving from a network node a trigger for an aperiodic report; using a pattern to map the signaled trigger to a particular downlink component carrier within a group of downlink component carriers that are configured for a user equipment to determine that the particular downlink component carrier is the subject the aperiodic report; and sending an aperiodic report about the determined particular downlink component carrier in response to receiving the trigger.

In accordance with a fifth aspect the exemplary embodiments of the invention include a memory storing a program of computer readable instructions that when executed by a processor result in actions comprising: receiving from a network node a trigger for an aperiodic report; using a pattern to map the signaled trigger to a particular downlink component carrier within a group of downlink component carriers that are configured for a user equipment to determine that the particular downlink component carrier is the subject the aperiodic report; and sending an aperiodic report about the determined particular downlink component carrier in response to receiving the trigger.

In accordance with a sixth aspect the exemplary embodiments of the invention include an apparatus comprising at least one processor and at least one memory including computer program code. In this sixth aspect the at least one memory and the computer program code are configured, with the at least one processor, to cause the apparatus to at least: receive from a network node a trigger for an aperiodic report; use a pattern to map the signaled trigger to a particular downlink component carrier within a group of downlink component carriers that are configured for a user equipment to determine that the particular downlink component carrier is the subject the aperiodic report; and send an aperiodic report about the determined particular downlink component carrier in response to receiving the trigger.

In accordance with a seventh aspect the exemplary embodiments of the invention include a method comprising: receiving an aperiodic report from a user equipment in reply to a trigger; and for the case in which the triggered aperiodic report is for a time at which resources have been previously allocated to the user equipment for a periodic report, associating the received aperiodic report with a downlink component carrier that is associated with the previously allocated resources.

In accordance with an eighth aspect the exemplary embodiments of the invention include a memory storing a program of computer readable instructions that when executed by a processor result in actions comprising: in response to receiving an aperiodic report from a user equipment in reply to a trigger, and for the case in which the triggered aperiodic report is for a time at which resources have been previously allocated to the user equipment for a periodic report, associating the received aperiodic report with a downlink component carrier that is associated with the previously allocated resources.

In accordance with a ninth aspect the exemplary embodiments of the invention include an apparatus comprising at least one processor and at least one memory including computer program code. In this ninth aspect the at least one memory and the computer program code are configured, with the at least one processor, to cause the apparatus to at least: receive an aperiodic report from a user equipment in reply to a trigger; and for the case in which the triggered aperiodic report is for a time at which resources have been previously allocated to the user equipment for a periodic report, associate the received aperiodic report with a downlink component carrier that is associated with the previously allocated resources.

In accordance with a tenth aspect the exemplary embodiments of the invention include a method comprising: receiving from a network node a trigger for an aperiodic report; and for the case in which the triggered aperiodic report is for a time at which resources have been previously allocated by the network node for a periodic report, compiling the triggered aperiodic report about a downlink component carrier that is associated with the previously allocated resources.

In accordance with an eleventh aspect the exemplary embodiments of the invention include a memory storing a program of computer readable instructions that when executed by a processor result in actions comprising: in response to receiving from a network node a trigger for an aperiodic report, and for the case in which the triggered aperiodic report is for a time at which resources have been previously allocated by the network node for a periodic report, compiling the triggered aperiodic report about a downlink component carrier that is associated with the previously allocated resources.

In accordance with a twelfth aspect the exemplary embodiments of the invention include an apparatus comprising at least one processor and at least one memory including computer program code. In this twelfth aspect the at least one memory and the computer program code are configured, with the at least one processor, to cause the apparatus to at least: receive from a network node a trigger for an aperiodic report; and for the case in which the triggered aperiodic report is for a time at which resources have been previously allocated by the network node for a periodic report, compile the triggered aperiodic report about a downlink component carrier that is associated with the previously allocated resources.

These and other aspects are set forth in further detail below.

BRIEF DESCRIPTION OF THE DRAWINGS

FIG. 1 reproduces FIG. 4 of 3GPP TS 36.300 (v8.6.0), and shows the overall architecture of the E-UTRAN system.

FIG. 2 is a schematic diagram of a radio spectrum in which cross-scheduling can be employed, in which five component carrier bandwidths are aggregated into a single LTE Release 10 bandwidth.

FIGS. 3A-B illustrate different DL CC groupings according to exemplary embodiments of the invention.

FIG. 7 shows a more particularized block diagram of a user equipment such as that shown at FIG. 6.

DETAILED DESCRIPTION

Figure 4:
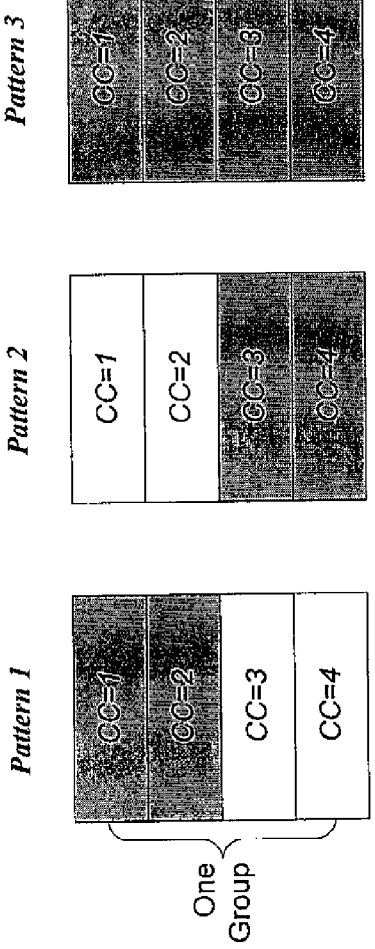
FIG. 4 Illustrates higher-layer configured CQI/PMI/RI report pattern according to an exemplary embodiment of the invention

The examples below are in the context of a LTE Release 10 system but may be employed with any CA type wireless communication system. FIG. 2 is specific to LTE Release 10 but still shows the general concept of CA; smaller frequency chunks such as for example 1.4 MHz, 5 MHz and 10 MHz CCs can be aggregated, and the total CA bandwidth can be less than or greater than 100 MHz. Some CA systems or embodiments may have non-contiguous CCs (for example the spectrum blocks forming the CCs might be far apart in terms of frequency such as 700 MHz and 2.1 GHz). Other CA systems or embodiments may have an asymmetric DL/UL CA which for example may be built into a CA system by combining a frequency division duplex FDD component carrier with a time division duplex TDD component carrier. LTE Release 10 is not the only CA-type system but is used in the examples here to explain the invention using specific examples, and so the concepts detailed below are not limited only to the LTE Release 10 system.

As a general overview, in a first approach to resolve the aperiodic CQI triggering for the case of multiple DL CCs, exemplary embodiments of the invention divide all active DL CCs into several groups, at least one group having a plurality of DL CCs, and triggering each group for aperiodic CQI/PMI reporting independently of other groups. In these exemplary embodiments, the specific individual DL CC(s) for which the UE needs to report CQI/PMI/RI is determined based on a pattern. The pattern here is used to indicate which DL CC(s) within the group needs to report CQI/PMI/RI, and the pattern could be pre-defined, or signaled by higher layer.

One technical effect of these exemplary embodiments is that different aperiodic CQI reports are enabled for different carriers by allowing one DCI to trigger reports from multiple carriers. Another technical effect of these exemplary embodiments is that new bits are not needed in the DCI to handle aperiodic reporting in the case of CA with multiple DL CCs. The inventors consider this a good tradeoff between full flexibility which needs more bits in DCI, and one DCI per carrier type of solution such as if the LTE Release 819 concept were extended to CA by adding further signaling bits.

In addition, in a second approach exemplary and non-limiting embodiments of the invention utilize the periodic CQI/PMI/RI pattern configured on a per CC basis to indicate the DL CC which is the subject of the aperiodic CQI/PMI/RI trigger. Substituting the more detailed (and frequency selective) aperiodic CQI/PMI report for the already-scheduled periodic report gives the eNB the flexibility to obtain more detailed information on the DL channel whenever it needs it, and saves signaling overhead by eliminating both periodic and aperiodic reports being sent close in time to one another for the same DL channel. These further exemplary embodiments of the second approach are complementary with the embodiments of the first approach, and these various embodiments may be used together or independently of one another.

The above two distinct but complementary approaches are now detailed by example. In exemplary embodiments of the first approach, all of the activated DL CCs for a UE are divided into several groups. There is at least one such group that includes a plurality of DL CCs. The DCI format 0 with CQI request=1 will trigger CQI/PMI/RI report for corresponding group(s).

The manner in which the different configured DL CCs are grouped may be signaled to the UE via higher layer signaling (for example, RRC or MAC layer signaling). In LTE Release 8/9, setting the CQI-request bit to one triggers the UE to send a CQI/PMI/RI report, and since there is no CA in LTE Release 8/9 there is no ambiguity as to what channel the UE is to measure, which is the subject of the CQI request. Still using only one bit to trigger that an aperiodic CQI report is to be sent, in these exemplary embodiments that bit is set to indicate that an aperiodic CQI/PMI/RI report is requested, but the UE interprets the bit as requesting it for one (or more) of the DL CCs that are in the group corresponding to the received CQI request (DCI format 0 with CQI-request=1).

The DL CC group(s) that is the subject of the report trigger can be indicated for example by an index of DL CCs where the DCI format 0 with CQI-request=1 is sent; or by some predefined principle, for example alternately reporting for each group.

For each triggered group, the DL CC(s) that is the subject of the request (the DL CC for which the UE needs to report CQI/PMI/RI) is determined based on a pattern. Such an exemplary pattern is used to indicate which DL CC(s) within the indicated group is the subject of the CQI/PMI/RI request. By example only, such a pattern could be pre-defined, or signaled by higher layer (for example by RRC signaling or MAC signaling as noted above), or defined implicitly.

For the case of higher layer signaling to define the pattern, by example signaling bits could be involved into a RRC or MAC command to define the pattern directly, or to select the pattern that is to be currently utilized from some set of pre-defined candidates, or to simply toggle an existing pattern within the group.

For the case of an implicitly defined pattern, the UE and the eNB would have some common understanding about the defined pattern within the'group, such as for example based on pre-defined rule(s). Such pre-defined rules can be for example:
  Within the group, report CQI/PMI/RI for the DL CC(s) whose CQI/PMI/RI has not been updated for a time longer than a time-threshold.
  Within the group, report CQI/PMI/RI for the DL CC(s) which has not been allocated resources for periodic CQI/PMI/RI reports.
  Within the group, report CQI/PMI/RI for all (activated) DL CCs belonging to the group.

FIGS. 3A-B illustrate two different examples of this first approach. Assume for FIG. 3A that DL CC #s 1, 2, 3 and 4 are activated/configured for a particular UE. In the FIG. 3A example, the UE's activated CCs are divided into two groups, in which a first group includes CC#s 1 and 2 and a second group includes CC#2 3 and 4. This grouping may by example be signaled to the UE by higher layers. Now assume that the eNB sends to the UE a PDCCH with CQI-request=1 which is a request that triggers the UE to send an aperiodic CQI/PMI/RI report. In this example, there is a predefined pattern which indicates, for each $k^{th}$ trigger that the eNB sends and the UE receives, there is a corresponding $i^{th}$ group and a $j^{th}$ DL CC in the $i^{th}$ group. Assuming the pattern is (i,j)=(1,1),(2,1),(1,2),(2,2),..., alternately, then the trigger/request sent in FIG. 3A corresponds to (I, j)=(1,1) and identifies to the UE that the subject of its CQI/PMI report is CC#1 which is in the first group.

The correspondence may be as in the above example that the serial $k^{th}$ trigger matches to the serial set (i,j) of DL CC and group. In this instance the CC on which the PDCCH is sent is irrelevant to mapping to the DL CC that is the subject of the request. So by the above pattern for FIG. 3A the $k=1^{st}$ trigger request may be sent on DL CC#1 or on DL CC#3 and either one would map to (i,j)=(1,1).

Alternatively, the UL CC on which the eNB sends and the UE receives the trigger/request may correspond to one index such as group number, and then the serial $k^{th}$ trigger matches to the remaining index such as selecting which DL CC within the identified group is the subject of the trigger/request. In this case an example would have only the $k^{th}$ trigger matching to a $j^{th}$ DL CC and the DL CC on which the trigger/request was sent mapping to the $i^{th}$ group. For example, a trigger/request sent on DL CC #1 maps to the j=$1^{st}$ group and a trigger/request sent on DL CC#2 maps to the j=$2^{nd}$ group. The UE receives two triggers/requests that are sent on DL CC#1; the first one of those maps to DL CC#1 and the second one maps to DL CC#2, both in the first group. The UE also receives two triggers/requests that are sent on DL CC#2; the first one maps to DL CC#3 and the second one maps to DL CC#4, both in the second group. Of course other more varied patterns may be defined.

Assume also for FIG. 3B that DL CC #s 1, 2, 3 and 4 are activated/configured for a particular UE. But in the FIG. 3B example, those four activated CCs are grouped into only one group. This grouping also may by example be signaled to the UE by higher layers. At FIG. 3B are shown two divisions within that one group: those DL CCs for which periodic CQI reports are not configured and those DL CCs for which they are. Recall from above that the periodic CQI reports are less detailed than aperiodic CQI reports. According to another example of the pattern, one PDCCH with CQI-request=1 will trigger detailed CQI/PMI/RI report for the CC(s) which had not been assigned a periodic CQI resource. In the FIG. 3B example the $k^{th}$ trigger/request sent by the eNB and received by the UE corresponds to the next DL CC in the group for which there is no resources allocated for periodic CQI reporting. But the periodic resource allocations are dynamic so the subset of DL CCs within the group for which periodic reporting resources are not allocated changes over time. Assume the k=1 trigger/request corresponds to DL CC#1 for the arrangement of DL CCs shown at FIG. 3B. Then the periodic reporting for DL CC#4 terminates and so DL CC#3 is the only DL CC for which periodic CQI reporting is configured. The next two triggers/requests k=2 and k=3 will correspond to DL CC#2 and DL CC#4. If during that time DL CC#1 is configured for periodic CQI reporting, the k=$4^{th}$ trigger/request will correspond to DL CC#2.

FIG. 4 illustrates yet another example of a pattern by which the eNB can define and the UE can determine which DL CC(s) is/are the subject of a CQI/PMI trigger/request. As above, assume that there is higher layer signaling to inform the UE which CQI/PMI/RI report pattern it is to use, and further assume that the UE's configured set of DL CCs is DL CC#s 1 through 4 and that they are all in the same group. In this case there are three potential patterns to choose from. When the higher layers signal to the UE that it is to use pattern 1, then each time it receives a trigger/request for aperiodic reporting from the eNB, the UE sends an aperiodic CQI/PMI report for DL CC#1 and DL CC#2 as shown at the left of FIG. 4. Said another way, the trigger informs the UE to send an aperiodic report on every DL CC in the subset of the group identified to it by the pattern. Different patterns define for which CCs to report CQI/PMI/RI in case the group is triggered via DCI format 0 with CQI-request=1. If the higher layers signaled the UE to use the pattern in the center of FIG. 4, then every trigger/request that the UE receives informs the UE to send an aperiodic CQI/PMI report for DL CC#3 and DL CC#4. If instead the higher layers signaled the UE to use the pattern at the right of FIG. 4, then every trigger/request that the UE receives informs the UE to send an aperiodic CQI/PMI report for DL CC#1 through 4.

The signaling bits could be signaled in a RRC or MAC command to define the pattern directly, or the signaling bits can instead select the utilized pattern from some set of pre-defined candidates (such as may be stipulated in a wireless standard and the pre-defined patterns are stored and indexed in a local memory of the UE and eNB). Or once one pattern is selected the next set of signaling bits can simply toggle to the next pattern in the pre-defined list, such as toggling among the three different pre-defined pattern options shown at FIG. 4.

Figure 5:
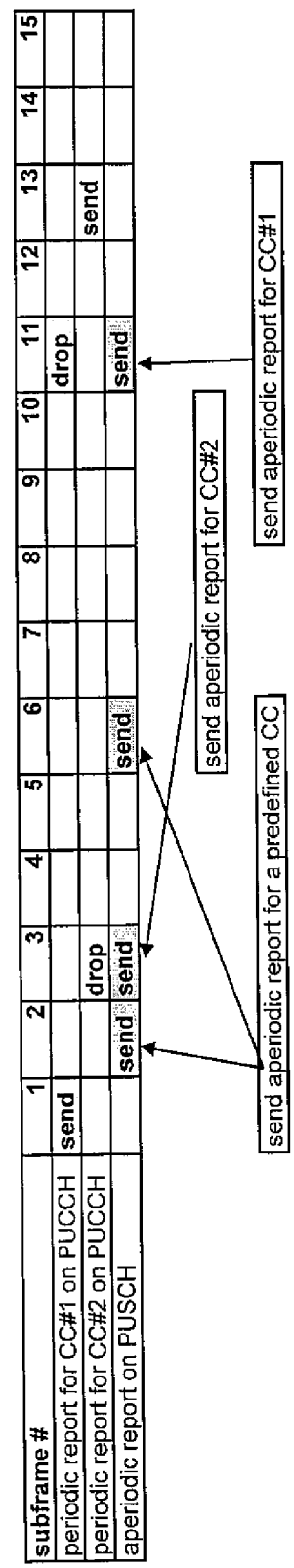
FIG. 5 illustrates utilizing periodic CQI/PMI/RI configuration to indicate the DL CC for aperiodic reporting according to an exemplary embodiment of the invention.

FIG. 5 illustrates an example of the second approach to solving CQI triggers for the CA case in which there are multiple DL CCs configured/activated for a particular UE. This second approach uses the periodic CQI/PMI/RI pattern which is configured on a per CC basis to indicate which of the multiple DL CCs is the subject of the aperiodic CQI/PMI/RI report trigger.

For this example assume that the UE is configured to transmit periodic CQI/PMI/RI report in a UL subframe N for a CC M. Assume further that the eNB requests/triggers an aperiodic CQI/PMI/RI report to be transmitted in that same UL subframe. In that case, according to the exemplary embodiment shown at FIG. 5 the UE shall send the aperiodic report for the CC M instead of the periodic report.

Two examples of this are shown at FIG. 5. At subframe 3 the UE is configured to send a periodic CQI report for DL CC#2. Since the UE also received a trigger for an aperiodic CQI/PMI report that would have to be sent in subframe 3, then the UE suspends sending the periodic CQI report for DL CC#2 in subframe 3 and instead sends in subframe 3, according to the aperiodic trigger it received, an aperiodic CQI/PMI report on DL CC#2 in that same subframe 3. In this manner the network can selectively obtain more detailed information on a particular DL CC with little increase to the overall signaling overhead, since there was originally a periodic CQI report scheduled to be sent on DL CC#2 in subframe 3. The other example of this in FIG. 5 is at subframe 11 for DL CC#1. When a collision occurs, the periodic report is dropped and an aperiodic report is sent for the CC that is identified for that subframe by the periodic pattern. Note that a single bit in each case selects differently DL CC#1 or DL CC#2 for the aperiodic report.

In a non-limiting embodiment, after the aperiodic report is sent the UE continues with the periodic CQI reports for so long as the persistent allocation of resources for those periodic reports continues. So for example if by FIG. 5 there is no radio resources allocated for periodic CQI reports on DL CC#1 after subframe #11, then the UE does not send one in place of dropping the periodic report at subframe 11. And similarly as shown the UE continues as subframe 13 its periodic reports for DL CC#2 which were suspended at subframe 3 due to the aperiodic report trigger.

Continuing with FIG. 5, for the case when there is no periodic CQI/PMI/RI report configured to be transmitted in the same subframe as the triggered aperiodic CQI/PMI/RI report, then the aperiodic CQI/PMI/RI report shall be derived for a predefined DL CC. In a non-limiting embodiment such a pre-defined DL CC can be defined by the pattern as discussed above with reference to the examples at FIGS. 3A-B and 4. As an alternative the configuration as described in the above-cited PCT/EP2010/053919 can be used to define the DL CC which is the subject of the aperiodic report trigger.

Following are some technical effects of certain of the above exemplary embodiments. By defining DL CC groups and the patterns in a group, the eNB has full flexibility to balance the DCI format overhead and CQI/PMI report granularity. Such grouping also allows for balancing the payload size of the reports depending on such dynamic considerations as the UE's channel conditions. This grouping is especially advantageous when the channel quality of some of the CCs is highly correlated while some other CCs observe very different conditions.

A particular advantage is that there is no increased DCI payload, and so no need to re-define the whole DCI bit-signaling regimen over and above that already developed for LTE Release 8/9. Also, these examples introduce no additional scheduling constraints to re-interpret DCI bit(s) as was noted in background above for at least one alternate solution. The inventors see the re-utilization of the periodic CQI configuration as a particularly elegant way to obtain CSI for multiple CCs with minimum standardization and implementation effort.

Figure 6:
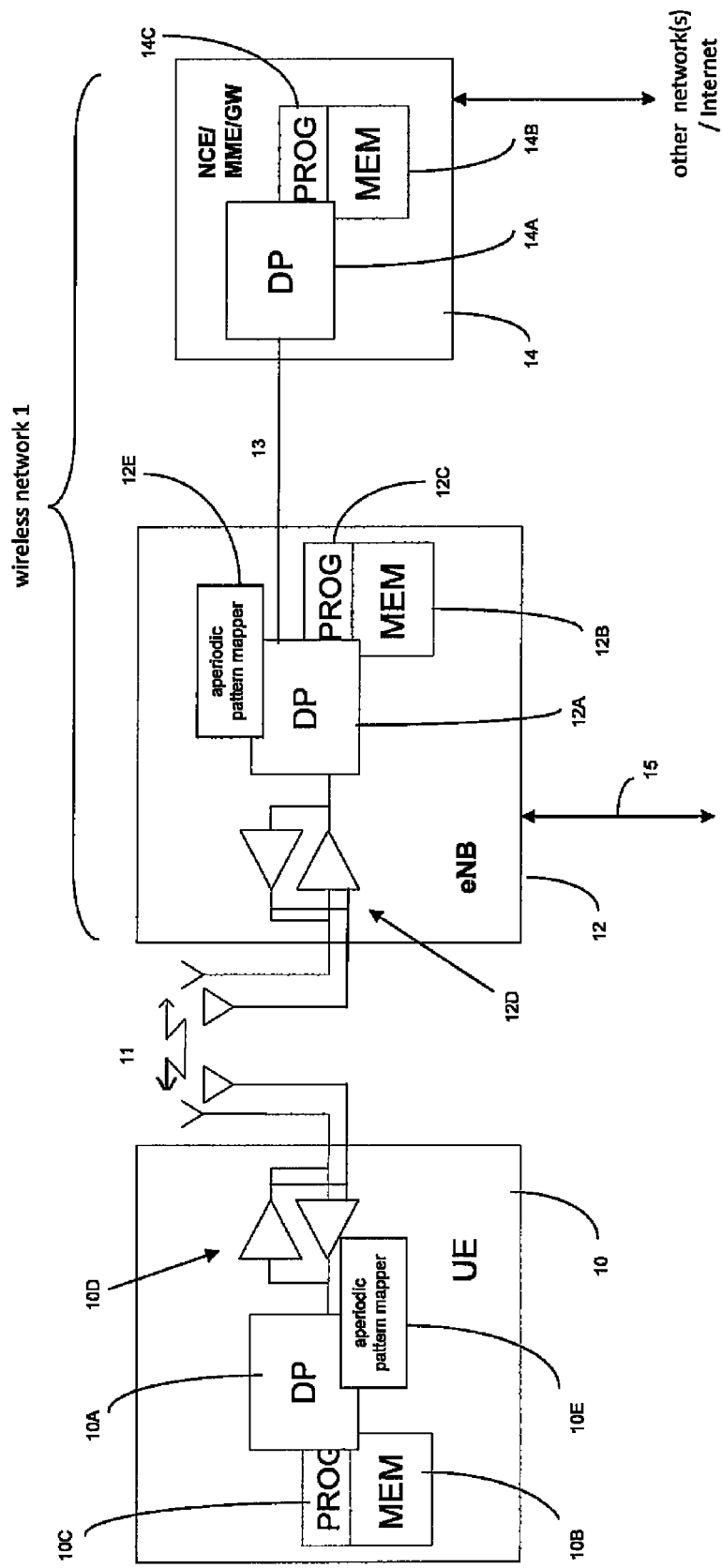
FIG. 6 shows a simplified block diagram of certain apparatus according to various exemplary embodiments of the invention.

Refer to FIG. 6 for a simplified block diagram of various electronic devices and apparatus that are suitable for use in practicing the exemplary embodiments of this invention. In FIG. 6 a wireless network 1 is adapted for communication over a wireless link 11 with an apparatus, such as a mobile communication device which above is referred to as a UE 10, via a network access node, such as a Node B (base station), and more specifically an eNB 12. The network 1 may include a network control element (NCE) 14 that may include the mobility entity/serving gateway MME/S-GW functionality shown in FIG. 1A, and which provides connectivity with a network, such as a telephone network and/or a data communications network (e.g., the internet). The UE 10 includes a controller, such as a computer or a data processor (DP) 10A, a computer-readable memory medium embodied as a memory (MEM) 10B that stores a program of computer instructions (PROG) 10C, and a suitable radio frequency (RF) transceiver 10D for bidirectional wireless communications with the eNB 12 via one or more antennas. The eNB 12 also includes a controller, such as a computer or a data processor (DP) 12A, a computer-readable memory medium embodied as a memory (MEM) 12B that stores a program of computer instructions (PROG) 12C, and a suitable RF transceiver 12D for communication with the UE 10 via one or more antennas. The eNB 12 is coupled via a data/control path 13 to the NCE 14. The path 13 may be implemented as the S1 interface shown in FIG. 1A. The eNB 12 may also be coupled to another eNB via data/control path 15, which may be implemented as the X2 interface shown in FIG. 1A.

At least one of the PROGs 10C and 12C is assumed to include program instructions that, when executed by the associated DP, enable the device to operate in accordance with the exemplary embodiments of this invention, as will be discussed below in greater detail.

That is, the exemplary embodiments of this invention may be implemented at least in part by computer software executable by the DP 10A of the UE 10 and/or by the DP 12A of the eNB 12, or by hardware, or by a combination of software and hardware (and firmware).

For the purposes of describing the exemplary embodiments of this invention the UE 10 may be assumed to also include an aperiodic pattern mapper 10E, and the eNB 12 may include an aperiodic pattern mapper 12E. While these mappers are shown at FIG. 6 as being separate from the DPs 10A, 12A, in various implementations their function may be embodied by a stand-alone processor or chip such as any of the various ones shown at FIG. 7, or in another implementation the function of the mappers 10E, 12E is incorporated into the main processor 10A, 12A.

In general, the various embodiments of the UE 10 can include, but are not limited to, cellular telephones, personal digital assistants (PDAs) having wireless communication capabilities, portable computers having wireless communication capabilities, image capture devices such as digital cameras having wireless communication capabilities, gaming devices having wireless communication capabilities, music storage and playback appliances having wireless communication capabilities, Internet appliances permitting wireless Internet access and browsing, as well as portable units or terminals that incorporate combinations of such functions.

The computer readable MEMs 10B and 12B may be of any type suitable to the local technical environment and may be implemented using any suitable data storage technology, such as semiconductor based memory devices, flash memory, magnetic memory devices and systems, Optical memory devices and systems, fixed memory and removable memory. The DPs 10A and 12A may be of any type suitable to the local technical environment, and may include one or more of general purpose computers, special purpose computers, microprocessors, digital signal processors (DSPs) and processors based on a multicore processor architecture, as non-limiting examples.

FIG. 7 illustrates further detail of an exemplary UE in both plan view (left) and sectional view (right), and the invention may be embodied in one or some combination of those more function-specific components. At FIG. 7 the UE 10 has a graphical display interface 20 and a user interface 22 illustrated as a keypad but understood as also encompassing touch-screen technology at the graphical display interface 20 and voice-recognition technology received at the microphone 24. A power actuator 26 controls the device being turned on and off by the user. The exemplary UE 10 may have a camera 28 which is shown as being forward facing (e.g., for video calls) but may alternatively or additionally be rearward facing (e.g., for capturing images and video for local storage). The camera 28 is controlled by a shutter actuator 30 and optionally by a zoom actuator 32 which may alternatively function as a volume adjustment for the speaker(s) 34 when the camera 28 is not in an active mode.

Within the sectional view of FIG. 7 are seen multiple transmit/receive antennas 36 that are typically used for cellular communication, The antennas 36 may be multi-band for use with other radios in the UE. The power chip 38 controls power amplification on the channels being transmitted and/or across the antennas that transmit simultaneously where spatial diversity is used, and amplifies the received signals. The power chip 38 outputs the amplified received signal to the radio-frequency (RF) chip 40 which demodulates and down-converts the signal for baseband processing. The baseband (BB) chip 42 detects the signal which is then converted to a bit-stream and finally decoded. Similar processing occurs in reverse for signals generated in the apparatus 10 and transmitted from it.

Signals to and from the camera 28 pass through an image/video processor 44 which encodes and decodes the various image frames. A separate audio processor 46 may also be present controlling signals to and from the speakers 34 and the microphone 24. The graphical display interface 20 is refreshed from a frame memory 48 as controlled by a user interface chip 50 which may process signals to and from the display interface 20 and/or additionally process user inputs from the keypad 22 and elsewhere.

Certain embodiments of the UE 10 may also include one or more secondary radios such as a wireless local area network radio WLAN 37 and a Bluetooth® radio 39, which may incorporate an antenna on-chip or be coupled to an off-chip antenna. Throughout the apparatus are various memories such as random access memory RAM 43, read only memory ROM 45, and in some embodiments removable memory such as the illustrated memory card 47 on which the various programs 10C are stored. All of these components within the UE 10 are normally powered by a portable power supply such as a battery 49.

The aforesaid processors 38, 40, 42, 44, 46, 50, if embodied as separate entities in a UE 10 or eNB 12, may operate in a slave relationship to the main processor 10A, 12A, which may then be in a master relationship to them. Embodiments of this invention need not be disposed in any individual processor/chip but may be disposed across various chips and memories as shown or disposed within another processor that combines some of the functions described above for FIG. 7. Any or all of these various processors of FIG. 7 access one or more of the various memories, which may be on-chip with the processor or separate therefrom. Similar function-specific components that are directed toward communications over a network broader than a piconet (e.g., components 36, 38, 40, 42-45 and 47) may also be disposed in exemplary embodiments of the access node 12, which may have an array of tower-mounted antennas rather than the two shown at FIG. 7.

Note that the various chips (e.g., 38, 40, 42, etc.) that were described above may be combined into a fewer number than described and, in a most compact case, may all be embodied physically within a single chip.

Figure 8:
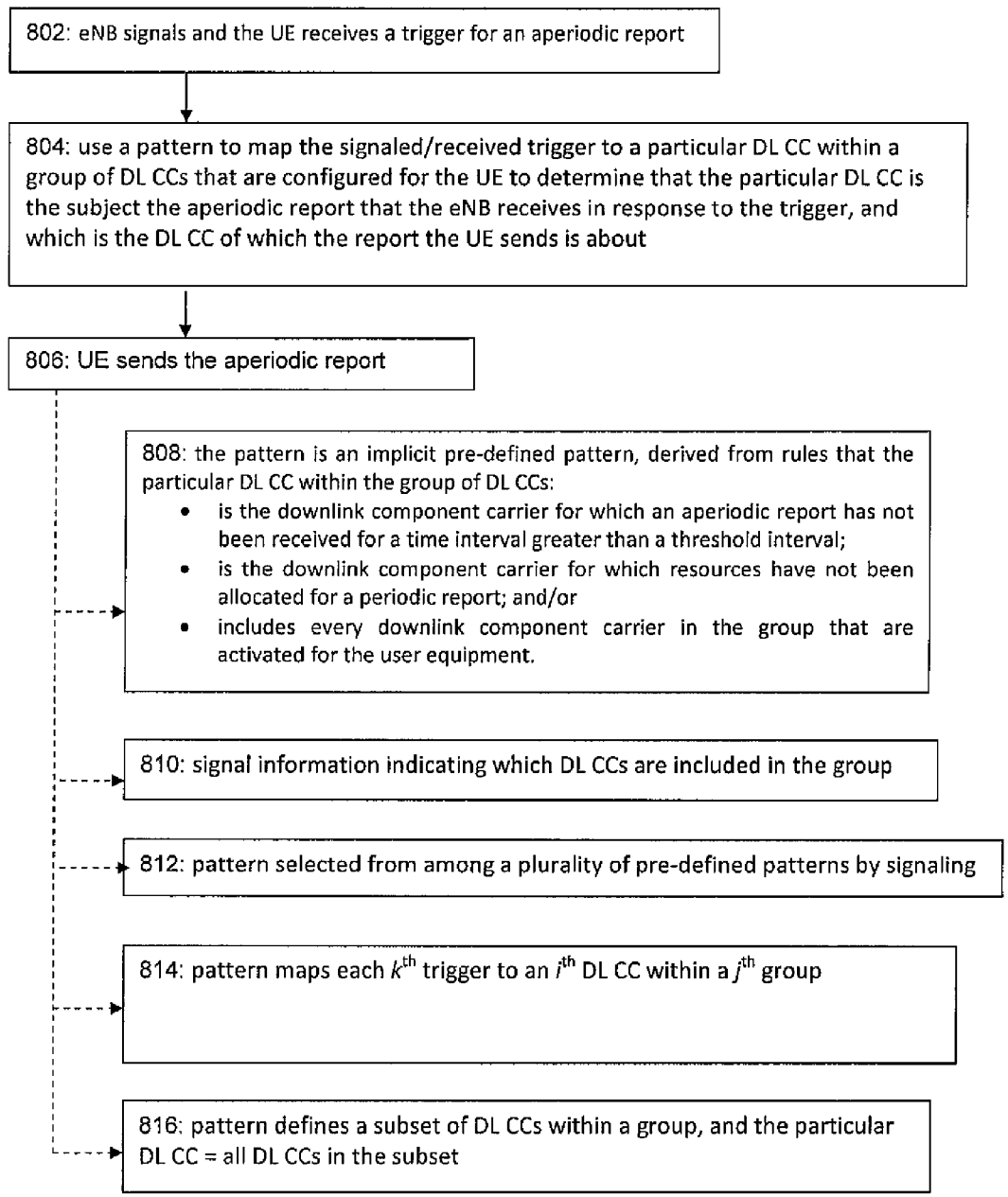
FIG. 8 is a logic flow diagram that illustrates the operation of a method, and a result of execution of computer program instructions embodied on a computer readable memory, in accordance with the exemplary embodiments of this invention detailed with respect to the first approach.

Without loss of generalization, an exemplary embodiment of the invention as detailed above for the first approach is shown in the flow diagram of FIG. 8. In accordance with an exemplary embodiment of the invention at block 802 the eNB signals to a UE and the UE receives from a network element/eNB a trigger for an aperiodic report. At block 804 the eNB uses a pattern to map the signaled trigger to a particular downlink component carrier within a group of downlink component carriers that are configured for the user equipment to determine that the particular downlink component carrier is the subject the aperiodic report that is received in response to the trigger. From the perspective of the UE the UE uses the pattern to determine that the particular downlink component carrier is the subject the aperiodic report which it compiles/sends at block 806 in response to receiving the trigger. That is, the aperiodic report that the UE sends at block 806 is about the determined particular downlink component carrier.

In a particular embodiment at block 808 the pattern is an implicit pre-defined pattern that is not signaled to the user equipment by the eNB, and from the UE's perspective is not received from the eNB. Block 808 has also rules from which the implicit pattern is derived, including that the particular downlink component carrier within the group of downlink component carriers:

is the downlink component carrier for which an aperiodic report has not been received for a time interval greater than a threshold interval;

is the downlink component carrier for which resources have not been allocated for a periodic report; and/or includes every downlink component carrier in the group that are activated for the user equipment.

In a particular embodiment at block 810, there is the additional step, preceding block 802, of the eNB signaling information to the UE indicating which downlink component carriers are included in the group. From the UE's perspective the UE determines which downlink component carriers are included in the group from the received signaling.

In a particular embodiment at block 812, the pattern is selected from among a plurality of pre-defined patterns by signaling sent from the eNB and received at the user equipment.

In a particular embodiment at block 814, the pattern maps each $k^{th}$ trigger to an $i^{th}$ downlink component carrier that is within a $j^{th}$ group, in which i, j and k are integer indices. This is shown generally at FIG. 3A. For the FIG. 3B implementation of block 814 the pattern maps each $k^{th}$ trigger to an $i^{th}$ downlink component carrier for which resources for periodic reporting are not allocated that is within a $j^{th}$ group.

In a particular embodiment at block 816, the pattern defines a subset of downlink component carriers within a group and the particular downlink component carrier includes all downlink component carriers in the subset. This is shown generally at FIG. 4.

As detailed in the examples above, in any of the above embodiments the trigger may be the one-bit CQI request used in LTE Release 8/9.

Figure 9:
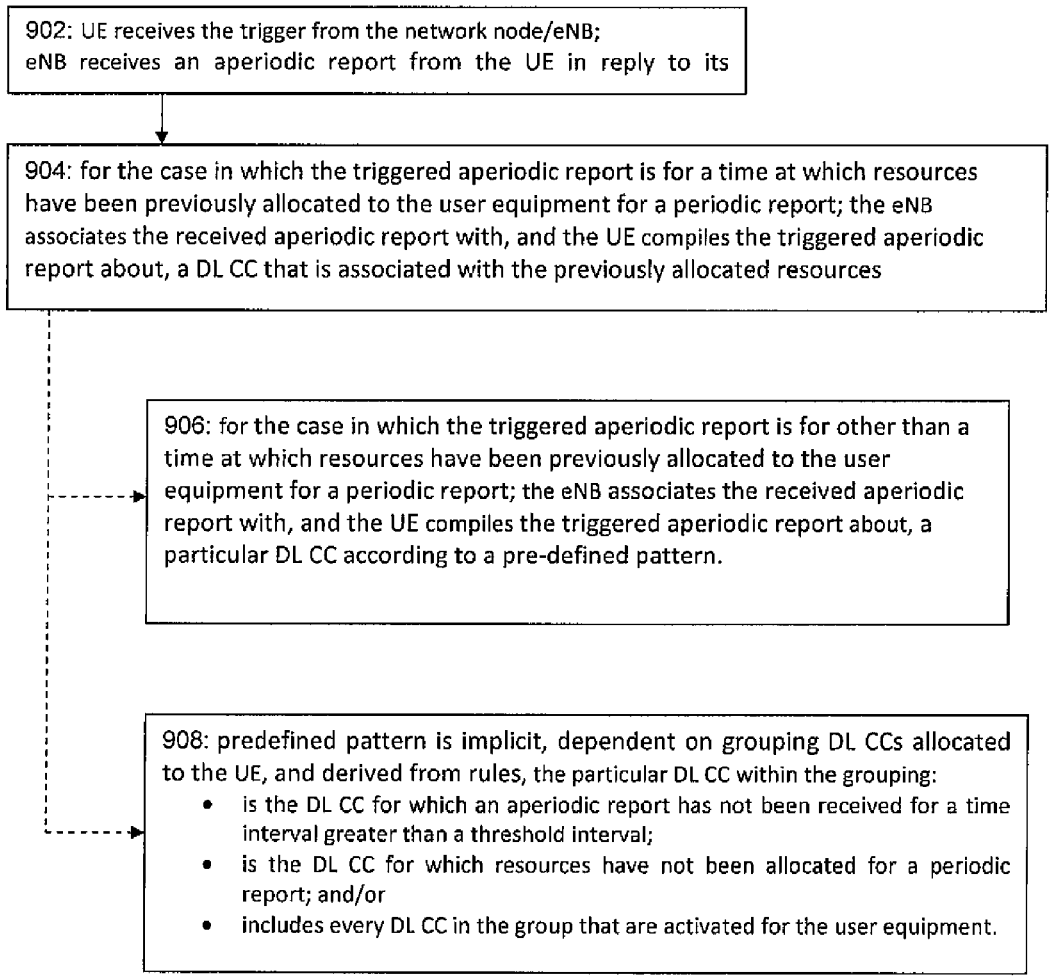
FIG. 9 is a logic flow diagram that illustrates the operation of a method, and a result of execution of computer program instructions embodied on a computer readable memory, in accordance with the exemplary embodiments of this invention detailed with respect to the second approach.

Without loss of generalization, an exemplary embodiment of the invention as detailed above for the second approach is shown in the flow diagram of FIG. 9. In accordance with an exemplary embodiment of the invention at block 902 the eNB receives an aperiodic report from a user equipment in reply to a trigger and from the UE's perspective the UE receives the trigger from the network node/eNB. At block 904, for the case in which the triggered aperiodic report is for a time at which resources have been previously allocated to the user equipment for a periodic report, the eNB associates the received aperiodic report with a downlink component carrier that is associated with the previously allocated resources. From the UE's perspective the UE compiles the triggered aperiodic report about a downlink component carrier that is associated with the previously allocated resources. The UE then of course sends to the eNB the aperiodic report that it compiled.

In a particular embodiment at block 906, for the case in which the triggered aperiodic report is for other than a time at which resources have been previously allocated to the user equipment for a periodic report, the eNB associates the received aperiodic report with a particular downlink component carrier according to a pre-defined pattern. From the UE's perspective the UE compiles the triggered aperiodic report in block 906 about a particular downlink component carrier that maps to the trigger according to the pre-defined pattern.

In a particular embodiment at block 908, the predefined pattern is dependent on grouping downlink component carriers allocated to the UE, and the predefined pattern is implicit and derived from rules, such as for example the particular downlink component carrier within the grouping:

is the downlink component carrier for which an aperiodic report has not been received for a time interval greater than a threshold interval;
 is the downlink component carrier for which resources have not been allocated for a periodic report; and/or
 includes every downlink component carrier in the group that are activated for the user equipment.

FIGS. 8-9 may be considered to be logic flow diagrams that illustrates the operation of methods, and the result of execution of computer program instructions, in accordance with the exemplary embodiments of this invention. Dashed lines at FIG. 8-9 indicate optional elements. The various blocks shown in FIGS. 8-9 may be viewed as method steps, and/or as operations that result from operation of computer program code, and/or as a plurality of coupled logic circuit elements constructed to carry out the associated function(s).

For example, the UE and eNB, or one or more components thereof, can form an apparatus comprising at least one processor and at least one memory including computer program code, in which the at least one memory and the computer program code are configured to, with the at least one processor, cause the apparatus to perform the elements shown at FIGS. 8-9 and/or recited in further detail above.

In general, the various exemplary embodiments may be implemented in hardware or special purpose circuits, software, logic or any combination thereof. For example, some aspects may be implemented in hardware, while other aspects may be implemented in firmware or software which may be executed by a controller, microprocessor or other computing device, although the invention is not limited thereto. While various aspects of the exemplary embodiments of this invention may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

It should thus be appreciated that at least some aspects of the exemplary embodiments of the inventions may be practiced in various components such as integrated circuit chips and modules, and that the exemplary embodiments of this invention may be realized in an apparatus that is embodied as an integrated circuit. The integrated circuit, or circuits, may comprise circuitry (as well as possibly firmware) for embodying at least one or more of a data processor or data processors, a digital signal processor or processors, baseband circuitry and radio frequency circuitry that are configurable so as to operate in accordance with the exemplary embodiments of this invention.

Various modifications and adaptations to the foregoing exemplary embodiments of this invention may become apparent to those skilled in the relevant arts in view of the foregoing description, when read in conjunction with the accompanying drawings. However, any and all modifications will still fall within the scope of the non-limiting and exemplary embodiments of this invention.

It should be noted that the terms "connected," "coupled," or any variant thereof, mean any connection or coupling, either direct or indirect, between two or more elements, and may encompass the presence of one or more intermediate elements between two elements that are "connected" or "coupled" together. The coupling or connection between the elements can be physical, logical, or a combination thereof. As employed herein two elements may be considered to be "connected" or "coupled" together by the use of one or more wires, cables and/or printed electrical connections, as well as by the use of electromagnetic energy, such as electromagnetic energy having wavelengths in the radio frequency region, the microwave region and the optical (both visible and invisible) region, as several non-limiting and non-exhaustive examples.

Further, the various names used for the described parameters and channels (for example, PDCCH, PUCCH) are not intended to be limiting in any respect, as these parameters may be identified by any suitable names.

Furthermore, some of the features of the various non-limiting and exemplary embodiments of this invention may be used to advantage without the corresponding use of other features. As such, the foregoing description should be considered as merely illustrative of the principles, teachings and exemplary embodiments of this invention, and not in limitation thereof.

What is claimed is:

1. An apparatus comprising:
   at least one processor;
   at least one memory including computer program code;
   the at least one memory and the computer program code configured to, with the at least one processor, cause the apparatus at least to:
   signal to a user equipment a trigger for an aperiodic report; and use a pattern to map the signaled trigger to a particular downlink component carrier within a group of downlink component carriers that are configured for the apparatus to determine that the particular downlink component carrier is the subject of the aperiodic report that the apparatus receives in response to the trigger, where a message that signals the trigger from the apparatus to the user equipment does not also signal the pattern to the user equipment.

2. The apparatus according to claim 1, in which the pattern is an implicit pre-defined pattern that is not signaled to the user equipment by the apparatus and the implicit pattern is derived from a set of rules stored in the at least one memory, the rules comprising at least one of:

the particular downlink component carrier within the group of downlink component carriers is the downlink component carrier for which an aperiodic report has not been received for a time interval greater than a threshold interval;

the particular downlink component carrier within the group of downlink component carriers is the downlink component carrier for which resources have not been allocated for a periodic report; and the particular downlink component carrier within the group of downlink component carriers includes every downlink component carrier in the group that are activated for the user equipment.

3. The apparatus according to claim 1, in which the at least one memory and the computer program code are configured, with the at least one processor, to cause the apparatus at least further to signal information to the user equipment indicating which downlink component carriers are included in the group.

4. The apparatus according to claim 1, in which the pattern is selected from among a plurality of pre-defined patterns by signaling sent to the user equipment.

5. The apparatus according to claim 1, in which the pattern maps each $k^{th}$ trigger to an $i^{th}$ downlink component carrier that is within a $j^{th}$ group, in which i,j and k are integer indices, or in which the pattern maps each $k^{th}$ trigger to an $i^{th}$ downlink component carrier for which resources for periodic reporting are not allocated that is within a $j^{th}$ group.

6. The apparatus according to claim 1, in which the pattern defines a subset of downlink component carriers within a group and the particular downlink component carrier includes all downlink component carriers in the subset.

7. The apparatus according to claim 1, in which the trigger is one bit.

8. An apparatus comprising:
at least one processor;
at least one memory including computer program code;
the at least one memory and the computer program code configured to, with the at least one processor, cause the apparatus at least to:
receive from a network node a trigger for an aperiodic report;
use a pattern to map the signaled trigger to a particular downlink component carrier within a group of downlink component carriers that are configured for a user equipment to determine that the particular downlink component carrier is the subject the aperiodic report; and
send an aperiodic report about the determined particular downlink component carrier in response to receiving the trigger, where
a message that signals the trigger to the apparatus from the network node does not also signal the pattern to the apparatus.

9. The apparatus according to claim 8, in which the pattern is an implicit pre-defined pattern that is not received at the apparatus from the network node and the implicit pattern is derived from a set of rules stored in the at least one memory, the rules comprising at least one of:

the particular downlink component carrier within the group of downlink component carriers is the downlink component carrier for which an aperiodic report has not been sent for a time interval greater than a threshold interval;

the particular downlink component carrier within the group of downlink component carriers is the downlink component carrier for which resources have not been allocated for a periodic report; and the particular downlink component carrier within the group of downlink component carriers includes every downlink component carrier in the group that are activated for the user equipment.

10. The apparatus according to claim 8, in which the at least one memory and the computer program code are configured, with the at least one processor, to cause the apparatus at least further to select the pattern from among a plurality of pre-defined patterns by signaling received from the network node.

11. The apparatus according to claim 8, in which the pattern is selected from among a plurality of pre-defined patterns by signaling sent to the user equipment.

12. The apparatus according to claim 8, in which the pattern maps each $k^{th}$ trigger to an $i^{th}$ downlink component carrier that is within a $j^{th}$ group, in which i,j and k are integer indices, or in which the pattern maps each $k^{th}$ trigger to an $i^{th}$ downlink component carrier for which resources for periodic reporting are not allocated that is within a $j^{th}$ group.

13. The apparatus according to claim 8, in which the pattern defines a subset of downlink component carriers within a group and the particular downlink component carrier includes all downlink component carriers in the subset.

14. The apparatus according to claim 8, in which the trigger is one bit.

15. An apparatus comprising:
at least one processor;
at least one memory including computer program code;
the at least one memory and the computer program code configured to, with the at least one processor, cause the apparatus at least to:
receive an aperiodic report from a user equipment in reply to a trigger; and
for the case in which the triggered aperiodic report is for a time at which resources have been previously allocated to the user equipment for a periodic report, associate the received aperiodic report with a downlink component carrier that is associated with the previously allocated resources.

16. The apparatus according to claim 15, in which the at least one memory and the computer program code are configured to, with the at least one processor, cause the apparatus at least further to:

for the case in which the triggered aperiodic report is for other than a time at which resources have been previously allocated to the user equipment for a periodic report, associate the received aperiodic report with a particular downlink component carrier according to a pre-defined pattern.

17. The apparatus according to claim 16, in which the predefined pattern is dependent on grouping downlink component carriers allocated to the user equipment, and the pre-defined pattern is implicit and derived from rules comprising at least one of:

the particular downlink component carrier within the grouping is the downlink component carrier for which an aperiodic report has not been received for a time interval greater than a threshold interval;

the particular downlink component carrier within the grouping is the downlink component carrier for which resources have not been allocated for a periodic report; and the particular downlink component carrier within the grouping includes every downlink component carrier in the group that are activated for the user equipment.

18. An apparatus comprising:

at least one processor;

at least one memory including computer program code;

the at least one memory and the computer program code configured to, with the at least one processor, cause the apparatus at least to:

receive from a network node a trigger for an aperiodic report; and for the case in which the triggered aperiodic report is for a time at which resources have been previously allocated by the network node for a periodic report, compile the triggered aperiodic report about a downlink component carrier that is associated with the previously allocated resources.

19. The apparatus according to claim 18, in which the at least one memory and the computer program code are configured to, with the at least one processor, cause the apparatus at least further to:

for the case in which the triggered aperiodic report is for other than a time at which resources have been previously allocated by the network node for a periodic report, compile the triggered aperiodic report about a particular downlink component carrier that maps to the trigger according to a pre-defined pattern.

20. The apparatus according to claim 19, in which the predefined pattern is dependent on grouping downlink component carriers allocated to the user equipment, and the predefined pattern is implicit and derived from rules comprising at least one of:

the particular downlink component carrier within the grouping is the downlink component carrier for which an aperiodic report has not been sent for a time interval greater than a threshold interval;

the particular downlink component carrier within the grouping is the downlink component carrier for which resources have not been allocated for a periodic report; and the particular downlink component carrier within the grouping includes every downlink component carrier in the group that are activated.

* * * * *

UNITED STATES PATENT AND TRADEMARK OFFICE
CERTIFICATE OF CORRECTION

PATENT NO. : 9,025,481 B2  
APPLICATION NO. : 13/643963  
DATED : May 5, 2015  
INVENTOR(S) : Gao et al.

Page 1 of 1

It is certified that error appears in the above-identified patent and that said Letters Patent is hereby corrected as shown below:

Drawings

Figure 8, Block 804 "of" is omitted between "the subject" and "the aperiodic report".

Specification

Col. 3, line 46 "of" is omitted between "the subject" and "the aperiodic report".

Col. 3, line 56 "of" is omitted between "the subject" and "the aperiodic report".

Col. 4, line 2 "of" is omitted between "the subject" and "the aperiodic report".

Col. 4, line 11 "of" is omitted between "the subject" and "the aperiodic report".

Col. 4, line 22 ""of" is omitted between "the subject" and "the aperiodic report".

Col. 4, line 37 "of" is omitted between "the subject" and "the aperiodic report".

Col. 12, line 34 "of" is omitted between "the subject" and "the aperiodic report".

Col. 12, line 37 ""of" is omitted between "the subject" and "the aperiodic report".

Claims

Col. 15, line 61, Claim 8 ""of" is omitted between "the subject" and "the aperiodic report".

Signed and Sealed this  
Seventh Day of June, 2016

Michelle K. Lee  
*Director of the United States Patent and Trademark Office*